United States Patent [19]
Hayduk et al.

[11] Patent Number: 5,949,870
[45] Date of Patent: Sep. 7, 1999

[54] SYSTEM AND METHOD FOR PROVIDING LOCAL NUMBER PORTABILITY SERVICE

[75] Inventors: John D. Hayduk, Holmdel; James Andrew Bajzath, Roebling; Patricia Huang, Somerset; Craig Loren Schafer, Piscataway, all of N.J.

[73] Assignee: Telcordia Technologies, Inc., Morristown, N.J.

[21] Appl. No.: 08/831,492

[22] Filed: Mar. 31, 1997

[51] Int. Cl.⁶ ................................................. H04M 7/00
[52] U.S. Cl. ........................................ 379/221; 379/230
[58] Field of Search ................................ 379/201, 207, 379/219, 221, 229, 230; 370/385

[56] References Cited

U.S. PATENT DOCUMENTS

| | | | |
|---|---|---|---|
| 5,598,464 | 1/1997 | Hess et al. .............................. | 379/213 |
| 5,602,909 | 2/1997 | Carkner et al. .......................... | 379/207 |
| 5,610,977 | 3/1997 | Williams et al. ........................ | 379/207 |
| 5,625,681 | 4/1997 | Butler, II ................................ | 379/207 |
| 5,661,792 | 8/1997 | Akinpelu et al. ........................ | 379/221 |
| 5,689,555 | 11/1997 | Sonnenberg ............................ | 379/220 |
| 5,696,816 | 12/1997 | Sonnenberg ............................ | 379/220 |
| 5,717,749 | 2/1998 | Sneed, Jr. et al. ...................... | 379/207 |
| 5,732,131 | 3/1998 | Nimmagadda et al. ................ | 379/211 |
| 5,764,745 | 6/1998 | Chan et al. .............................. | 379/207 |
| 5,768,358 | 6/1998 | Venier et al. ............................ | 379/207 |

Primary Examiner—Daniel S. Hunter
Attorney, Agent, or Firm—Joseph Giordano

[57] ABSTRACT

Local Number Portability (LNP) includes two capabilities: Location Routing Number (LRN) and Message Relay Service (MRS). The LRN capability allows proper call routing during a normal call. MRS allows proper execution of telephone services such as voice messaging and automatic callback. The system and method of the present invention implements LRN and MRS at an ISCP.

13 Claims, 15 Drawing Sheets

FIG. 9

SYSTEM AND METHOD FOR PROVIDING LOCAL NUMBER PORTABILITY SERVICE

CROSS-REFERENCE TO RELATED APPLICATIONS

This application relates to C. L. Schafer et al. U.S. patent application Ser. No. 08/829,595, filed concurrently, the contents of which are hereby incorporated by reference.

BACKGROUND OF THE INVENTION

The present invention relates generally to local number portability (LNP), and more particularly to the implementation of LNP in a telephone network.

Currently, local phone service is provided by a single company, such as a Regional Bell Operating Company (RBOC). These companies basically enjoy a monopoly over local phone service within their regions. Thus, efforts are being made to introduce competition into the local phone market to eliminate the monopolies and relieve the need to regulate the industry. Under the current system, however, if customers want to change from one service provider to another, they must also change their phone numbers. This is a serious deterrent to switching service providers and, thus, a hindrance to free and open competition.

To alleviate the problem, the FCC has mandated the introduction of LNP. In an LNP environment, ownership of a telephone or directory number shifts from the service provider to a particular telephone subscriber. Thus, subscribers may keep their directory numbers when changing, or porting, from one local service provider to another.

The FCC, while identifying required LNP functionality, did not set forth a particular implementation. There is a need, therefore, for a system and method to implement LNP.

SUMMARY OF THE INVENTION

To achieve these and other advantages and in accordance with the purposes of the invention, as embodied and broadly described, a method consistent with the present invention includes the steps of receiving a message, accessing a subscriber record according to information in the message, selecting one of a location routing number (LRN) feature manager or message relay service (MRS) feature manager according to information in the message, executing the selected feature manager to generate a response message according to information contained in the message and the subscriber record; and sending the response message.

Another method consistent with the present invention includes the steps of receiving a message, accessing a subscriber record according to information in the message, determining from the subscriber record if a subscriber has ported from one service provider to another, and, if the subscriber has ported, generating a response to the message including an LRN as a routing number.

Yet another method consistent with the present invention includes the steps of receiving a message; accessing a subscriber record according to information in the message; determining, based on the subscriber record, if a subscriber has ported from one service provider to another; if the subscriber has ported, determining whether a service provider provides the requested service; if the service provider provides the requested service, generating a response message including a destination point code of a network element and a subsystem number; determining, based on the subsystem number, whether final or intermediate routing will be used; if intermediate routing has been selected, assigning a translation type (TT) to the response message; substituting or not, based on a global title address (GTA), the location routing number (LRN) for the GTA in the response message; and sending the response message.

A system consistent with this invention includes a switch for sending a message, a signaling transfer point (STP) coupled to the switch for receiving and routing the message, an ISCP (Intelligent Service Control Point) coupled to the STP for receiving the message, a processor associated with the ISCP for executing a location routing number (LRN) feature manager and a message relay service (MRS) feature manager.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

FIG. 9 is a display of a subscriber record containing LNP data on a SPACE based system;

DETAILED DESCRIPTION

Reference will now be made in detail to the construction and operation of preferred implementations of the present invention which are illustrated in the accompanying drawings.

The following description of the preferred implementations of the present invention is only exemplary of the invention. The present invention is not limited to these implementations, but may be realized by other implementations.

Figure 1:
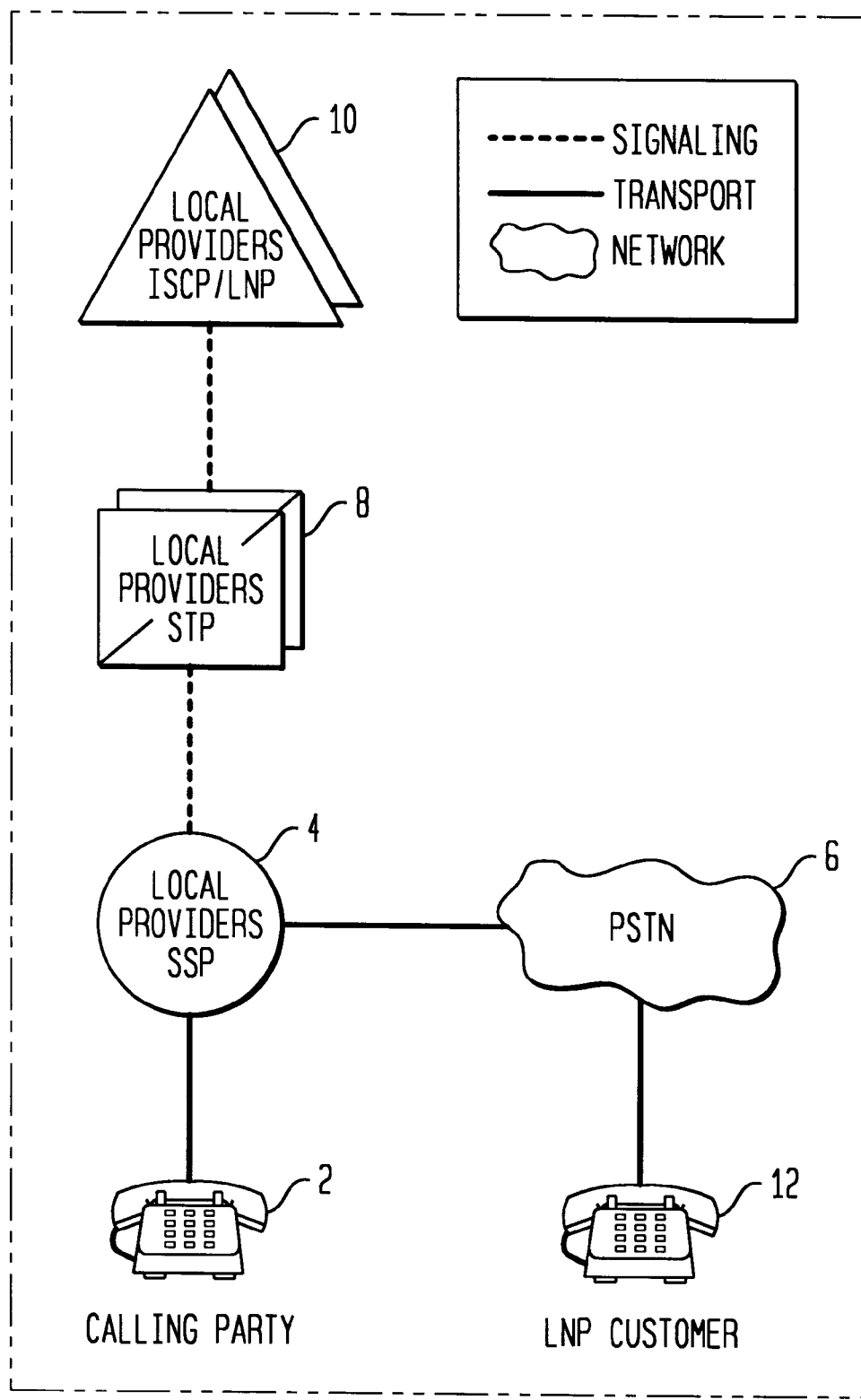
FIG. 1 is a drawing of a telephone network.

The overall network in which LNP will be implemented is shown generally in FIG. 1. The network includes a calling party 2 connected with a Services Switching Point (SSP) 4. SSP 4 is connected to the public switched telephone network (PSTN) 6, which is connected to a LNP customer 12. SSP 4 is also connected to a Signaling Transfer Point (STP) 8, which connects to an ISCP 10.

A system implementing LNP has two primary capabilities: Location Routing Number (LRN) and Message Relay Service (MRS).

Location Number Routing

As discussed above, LNP breaks the link between the NPA-NXX of a phone number and the geographic location of a corresponding switch. In short, LRN supports this aspect of LNP during a normal call.

Figure 2:
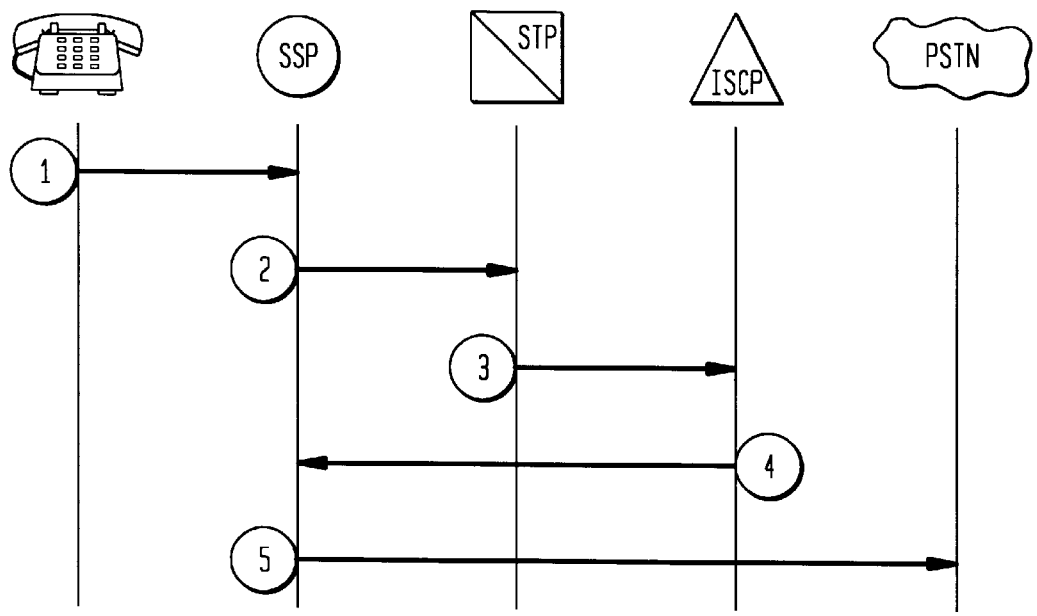
FIG. 2 is a drawing showing the call flow for Location Routing Number (LRN) routing.

Typical call processing is shown, for example, in FIG. 2. A calling party dials a destination number (step 1). As LNP will not be implemented in every local network simultaneously, each switch contains a table listing all the areas where customers have the option of porting their telephone number. The SSP, then, must determine if the NPA-NXX has been opened for LNP. if so, the SSP launches a query to a STP (step 2), which directs the query to the appropriate ISCP (step 3). If the dialed number is ported, the ISCP returns the LRN to the SSP as the routing number (step 4). If the dialed number is not ported, the ISCP will return the dialed number to the SSP as the routing number (step 4). The switch then uses the routing number returned from the ISCP to route the call (step 5).

Message Relay Service

Certain pre-LNP phone services were implemented based on the present link between the NPA-NXX of a telephone number and the geographic location of a network element. These services include switch resident services such as Custom Local Area Signaling Services (CLASS) and Inter-Switch Voice Messaging (ISVM), and network database resident services such as Line Information Database (LIDB) and Calling Name Delivery (CNAM) services.

In LNP, the link between the NPA-NXX of a telephone number and a particular network element is broken. MRS, then, is necessary to route messages for these services to the appropriate network elements when the NPA-NXX of the called party no longer uniquely identifies the targeted network element.

Currently, two standards have been proposed for how the network should handle message routing. One calls for "intermediate routing" of calls, the other for "final routing." Call flows for both types of routing are described below.

Figure 3:
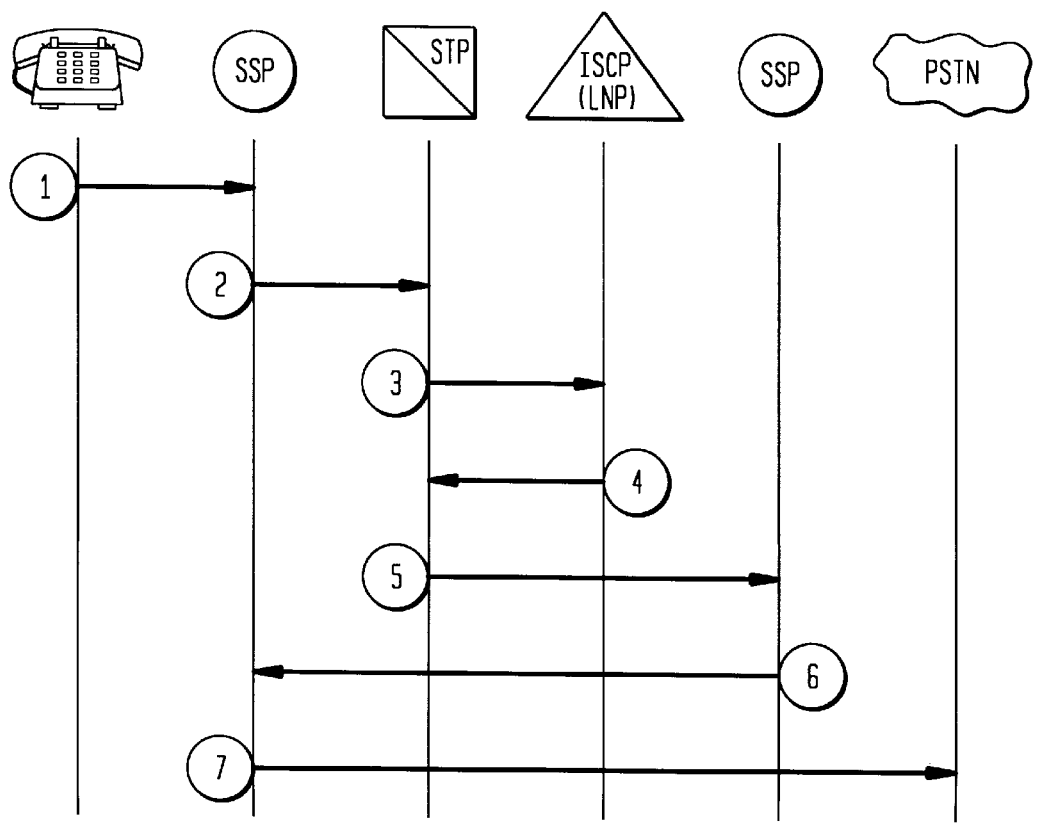
FIG. 3 is a drawing showing the call flow for Message Relay Service (MRS) intermediate routing for CLASS/ISVM services.

FIG. 3 shows the MRS associated with CLASS and ISVM for intermediate routing. The calling party first dials a series of digits (step 1). The SSP determines that the call requires assistance from the ISCP/LNP application, and launches a query to the STP (step 2), which directs the query to the appropriate ISCP (step 3). The ISCP executes the MRS and returns the Signaling Point Code (SPC) of the STP associated with the switch where the CLASS/ISVM service resides (step 4). The STP directs the query to the correct SSP (step 5). The SSP executes the service and returns the result back to the originating SSP (step 6). The originating SSP, using the supplied information, completes the call (step 7).

Figure 4:
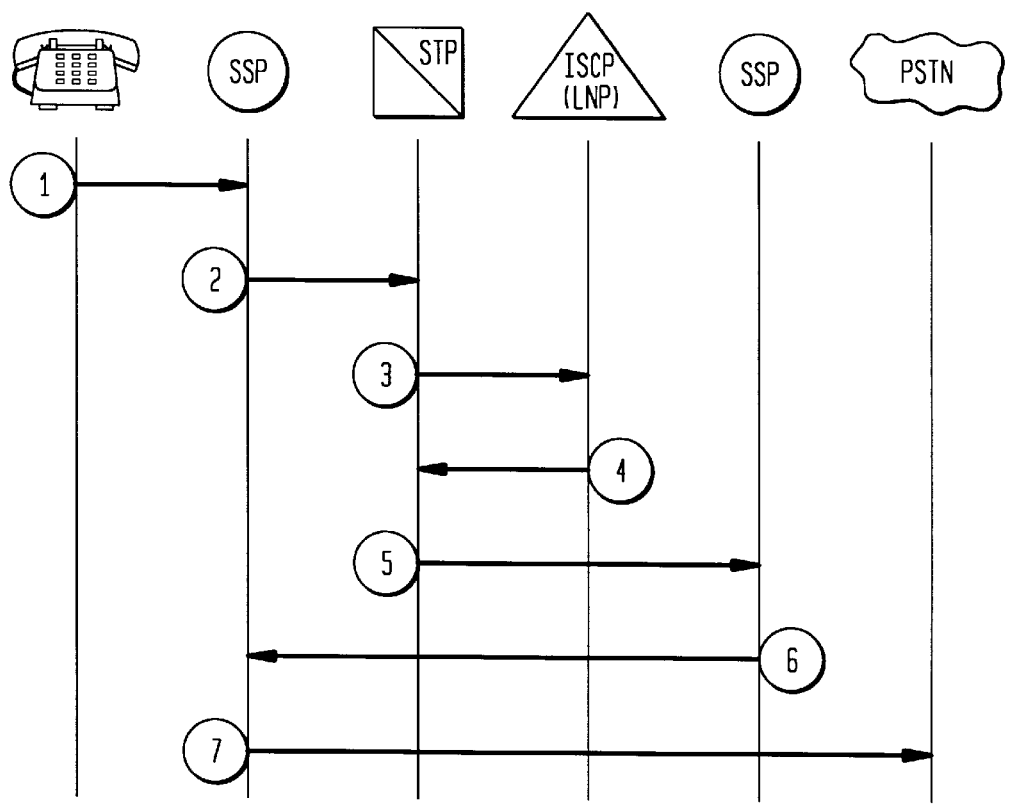
FIG. 4 is a drawing showing the call flow for MRS intermediate routing for LIDB/CNAM services.

FIG. 4 shows intermediate routing for the LIDB/CNAM services. The calling party dials a series of digits (step 1). The SSP determines that the call requires assistance from the ISCP/LNP application and launches a query to the STP (step 2). The STP directs the query to the appropriate ISCP (step 3). The ISCP executes the MRS and returns the SPC of the STP associated with the Signaling Control Point (SCP) where the LIDB/CNAM service resides (step 4). The STP directs the query to the correct SCP (step 5). The SCP executes the service and returns the results back to the originating SSP (step 6), which then completes the call using the supplied information (step 7).

Figure 5:
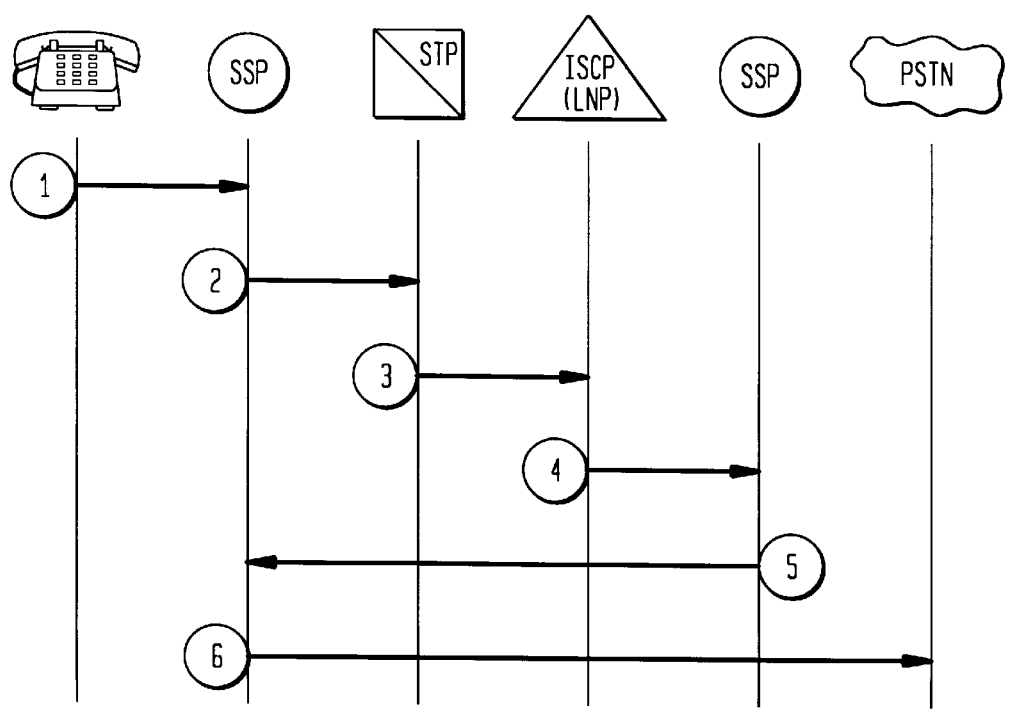
FIG. 5 is a drawing showing the call flow for MRS final routing for LIDB/CNAM services.

Final routing for the LIDB/CNAM services is shown in FIG. 5. The calling party dials a series of digits (step 1), and the SSP determines that the call requires assistance from the ISCP/LNP application. The SSP launches a query to the STP (step 2), which directs the query to the appropriate ISCP (step 3). The ISCP executes the MRS and determines the SPC of the SCP where the LIDB/CNAM service resides (step 4). The SCP executes the service and returns the results back to the originating SSP (step 5). The originating SSP, using the returned results, completes the call (step 6).

Figure 6:
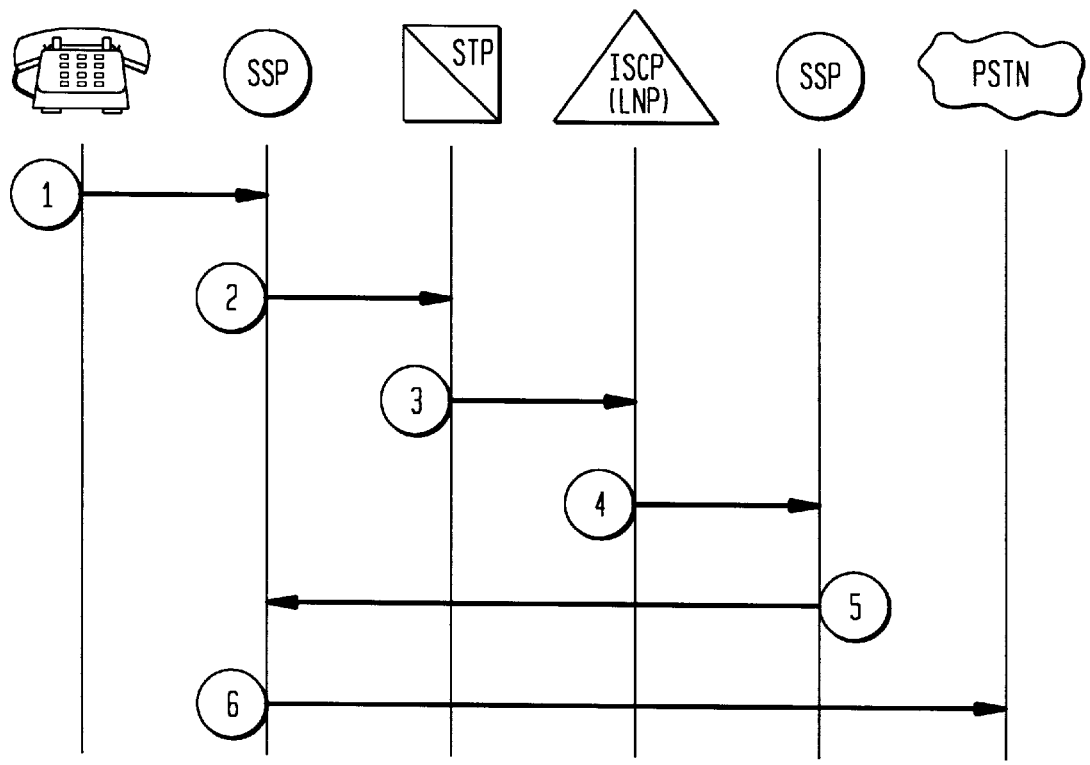
FIG. 6 is a drawing showing the call flow for MRS final routing for CLASS/ISVM services.

CLASS/ISVM final routing is shown in FIG. 6. The calling party dials a series of digits (step 1). The SSP determines that the call requires assistance from the ISCP/LNP application (step 2). The STP directs the query to the appropriate ISCP (step 3). The ISCP executes the MRS and determines the SPC of the switch where the CLASS/ISVM service resides (step 4). The SSP executes the service and returns the results back to the originating SSP (step 5). The originating SSP, using the supplied information, completes the call (step 6).

Figure 7:
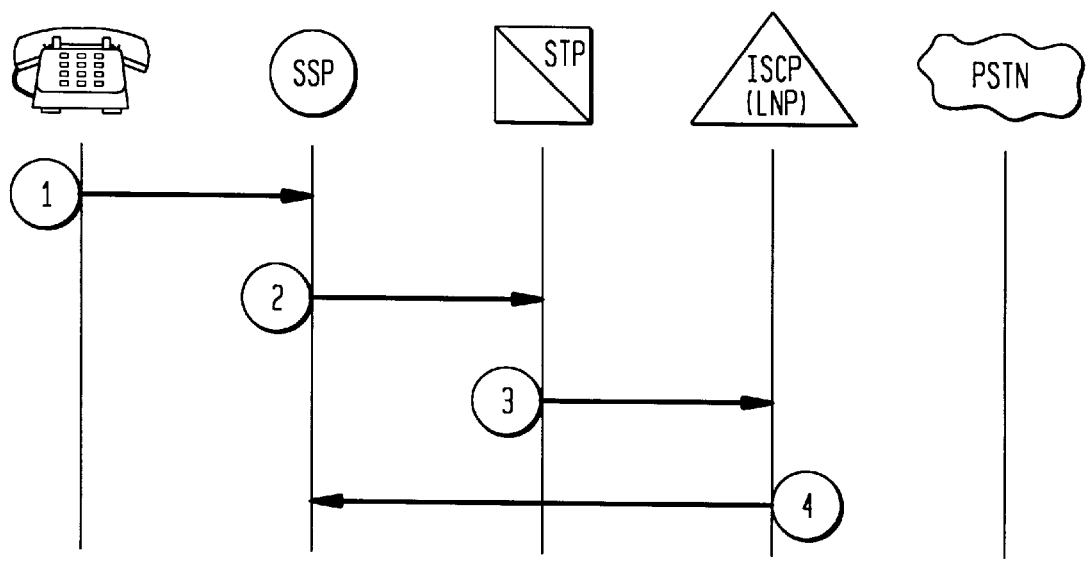
FIG. 7 is a drawing showing the call flow for MRS routing when an error is detected in the system.

It is also possible that a query will encounter an error during ISCP/LNP call processing. This scenario is shown in FIG. 7. The calling party dials a series of digits (step 1). The SSP determines that the call requires assistance from the ISCP/LNP application. The STP launches a query to the STP (step 2), which directs the query to the appropriate ISCP (step 3). The MRS service logic detects an error and notifies the SSP (step 4).

Implementation of LRN and MRS

Figure 8:
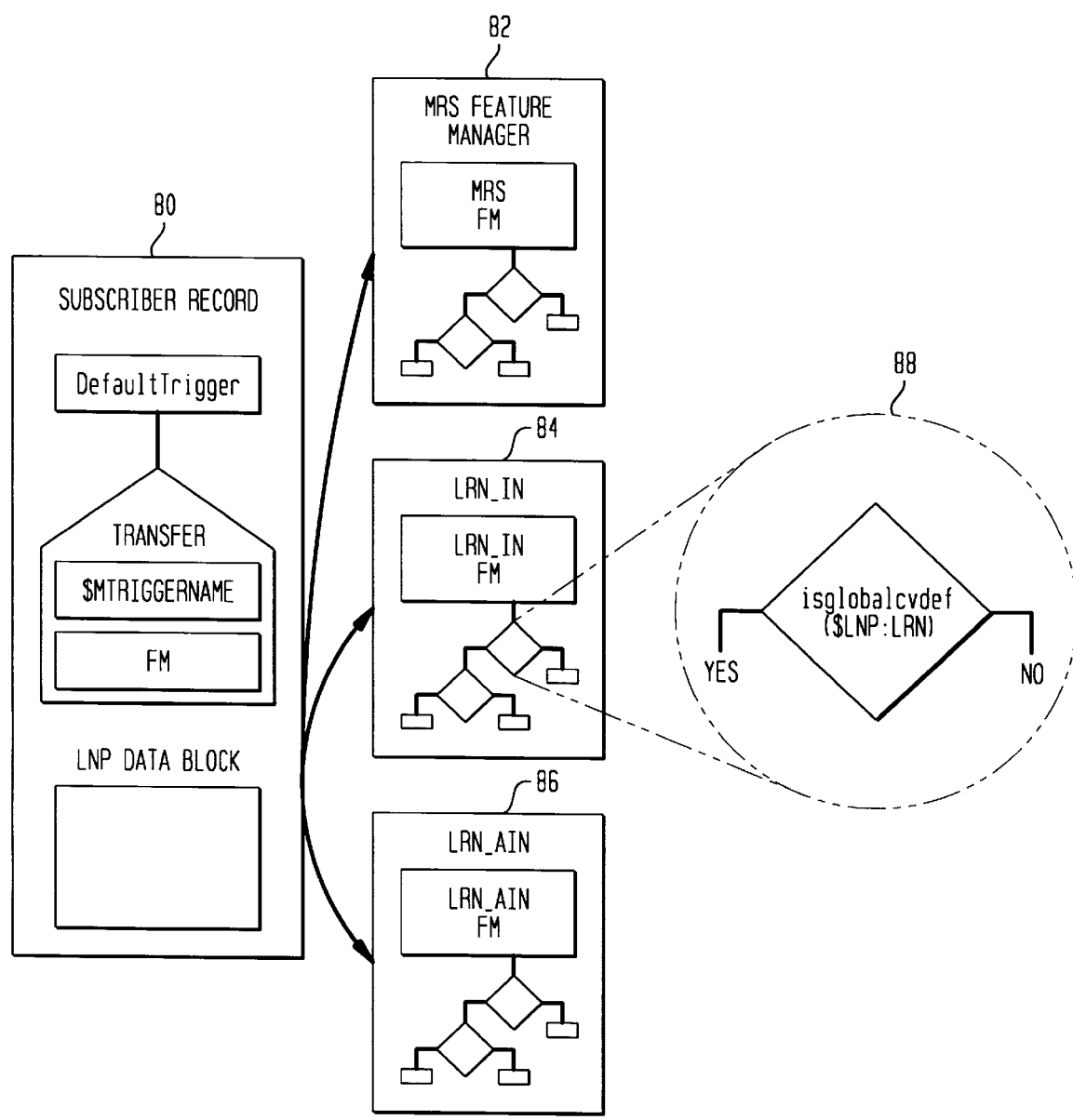
FIG. 8 is a drawing of the service architecture within an ISCP in accordance with an embodiment of the present invention.
Figure 9:
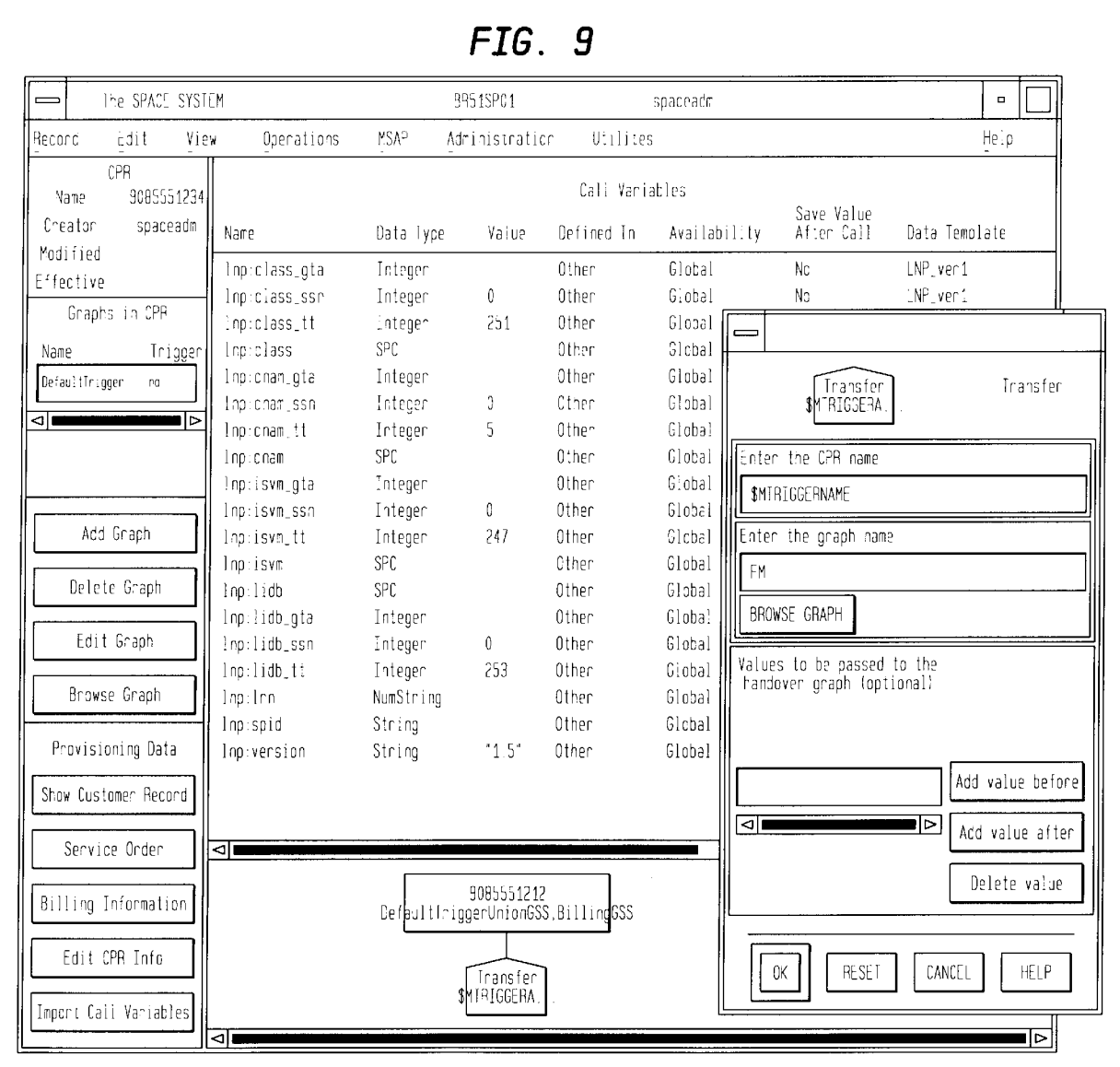
Figure 10:
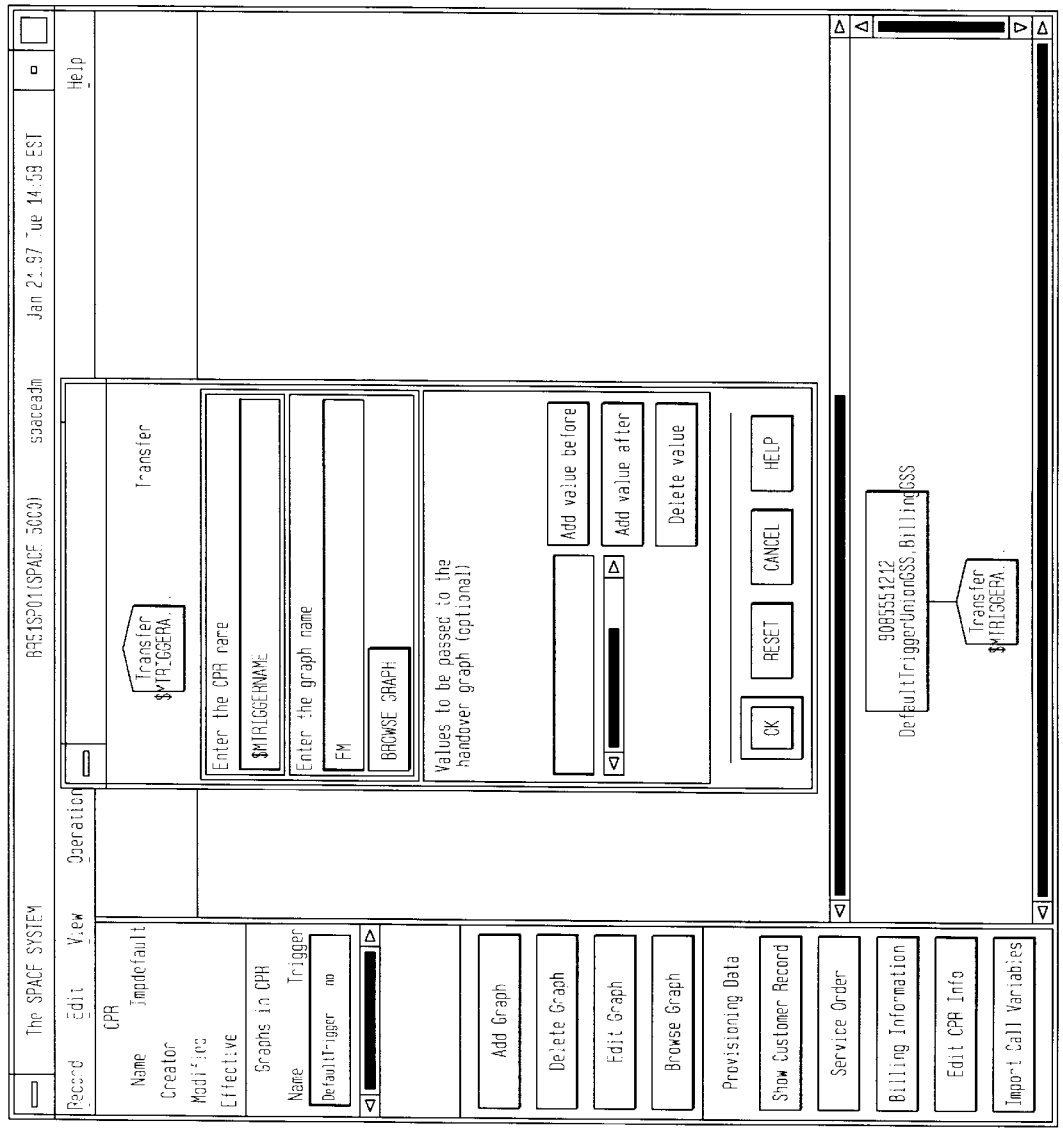
FIG. 10 is a display of a default subscriber record on a SPACE based system.

FIG. 8 shows the architecture of the service logic designed and implemented in a manner consistent with the present invention. In the LRN and MRS scenarios described above, a query arrives at an ISCP. The ISCP then determines if a subscriber record 80 exists for the ten-digit dialed number. A subscriber record contains LNP data and will exist if the subscriber has ported his number. A typical subscriber record for a ported subscriber is shown in FIG. 9. If a subscriber has not ported his number, and thus a subscriber record does not exist, the ISCP uses a default subscriber record. A typical default subscriber record is shown in FIG. 10.

Based on the type of query, subscriber record 80 is handed off to one of three feature managers. There is an MRS feature manager 82, an LRN feature manager for the Intelligent Network (IN) protocol 84, and an LRN feature manager for the Advanced Intelligent Network (AIN) protocol 86. Each feature manager is composed of a series of interconnected building blocks, an example of which is shown in circle 88, which constitute the feature manager.

The construction of the feature managers of FIG. 8 will now be discussed in more detail. Preferably, the feature managers are created in the SPACE system, commercially available from Bellcore.

Figure 11:
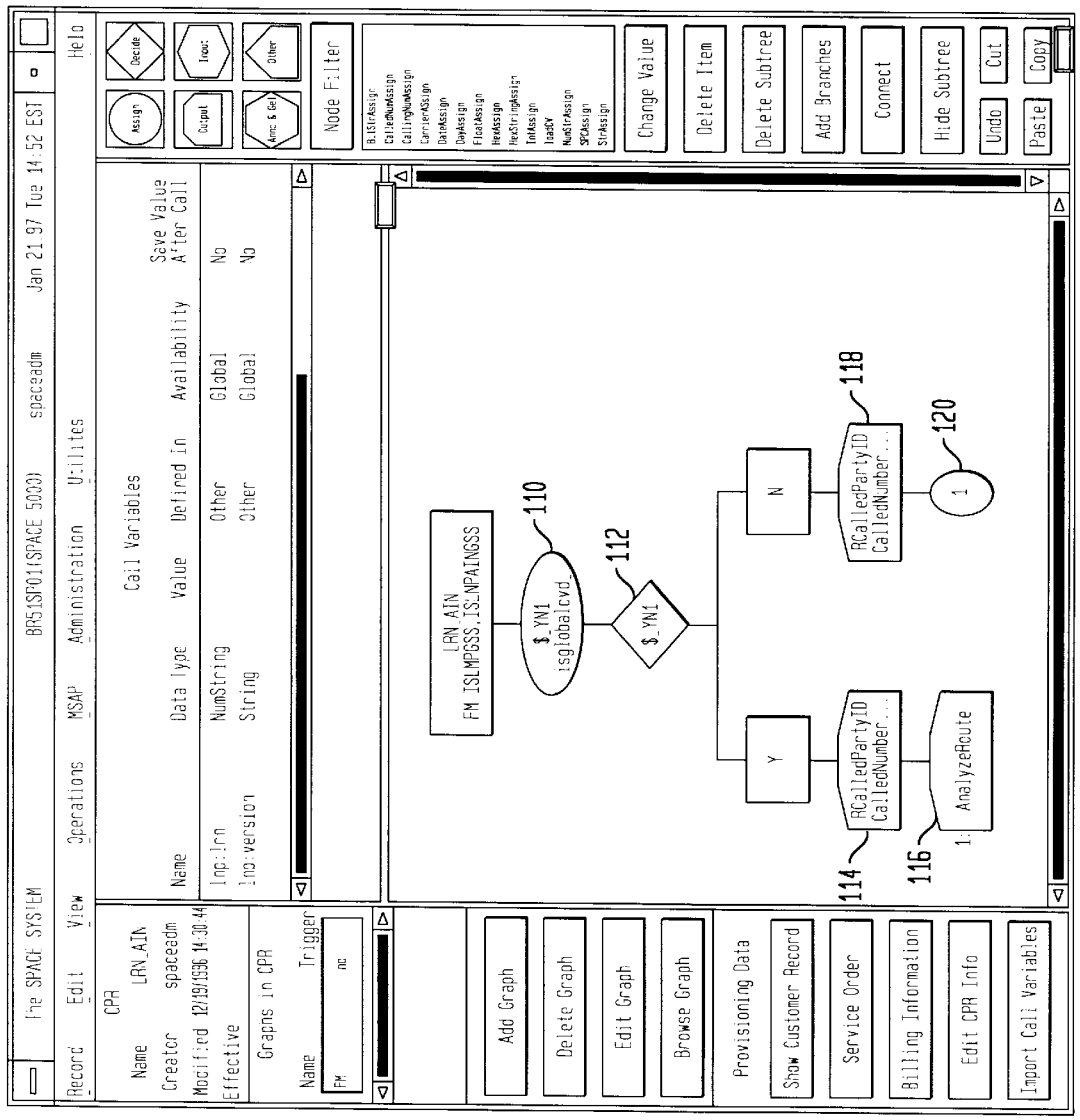
FIG. 11 is a display of the implementation of the LRN feature manager for the AIN protocol on a SPACE based system in accordance with an embodiment of the present invention.
Figure 12:
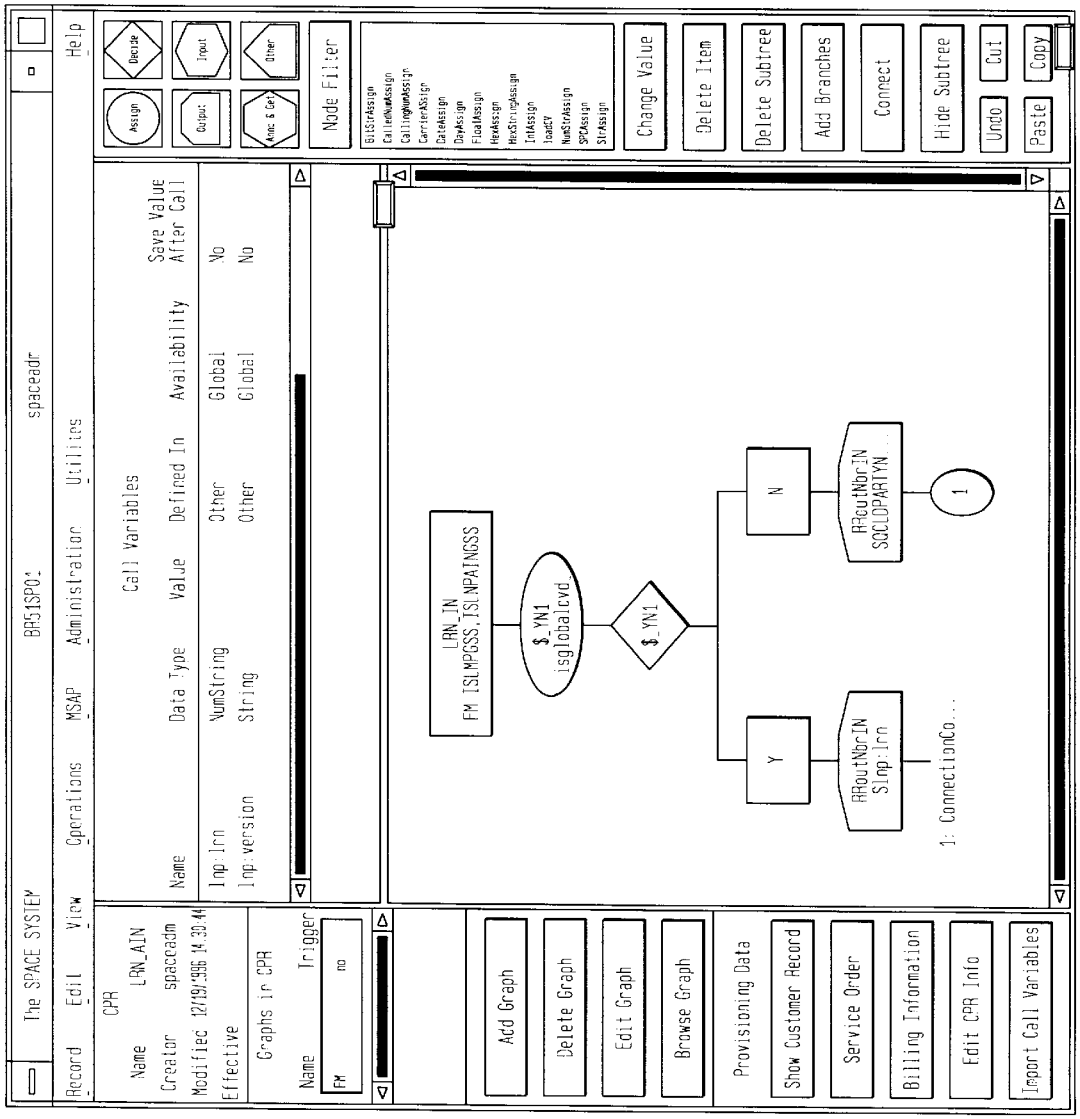
FIG. 12 is a display of the implementation of the LRN feature manager for the IN protocol on a SPACE based system in accordance with an embodiment of the present invention.
Figure 13A:
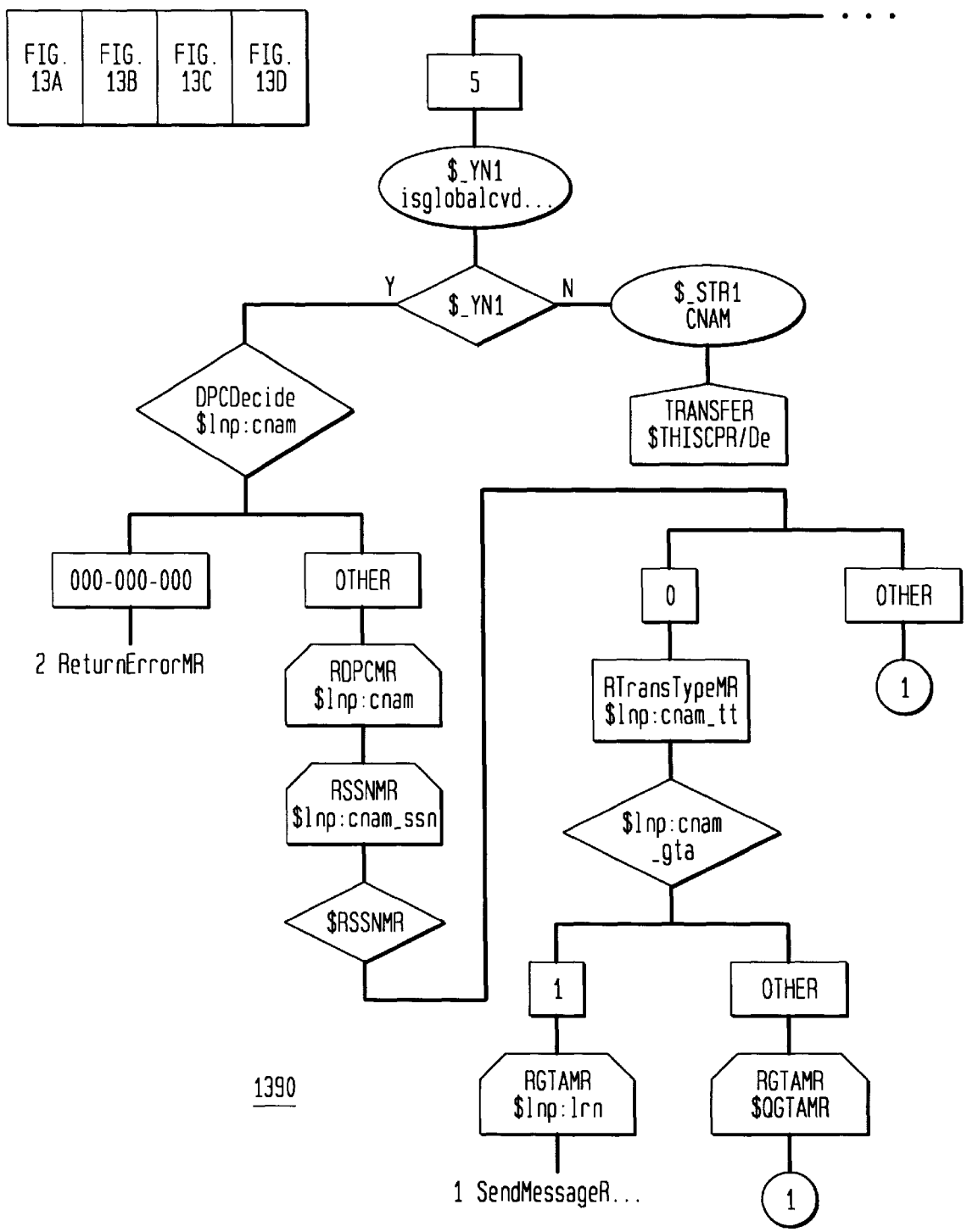
FIGS. 13A, 13B, 13C, and 13D, when arranged as shown in FIG. 13 are a drawing showing the implementation of the MRS feature manager in accordance with an embodiment of the present invention.
Figure 13B:
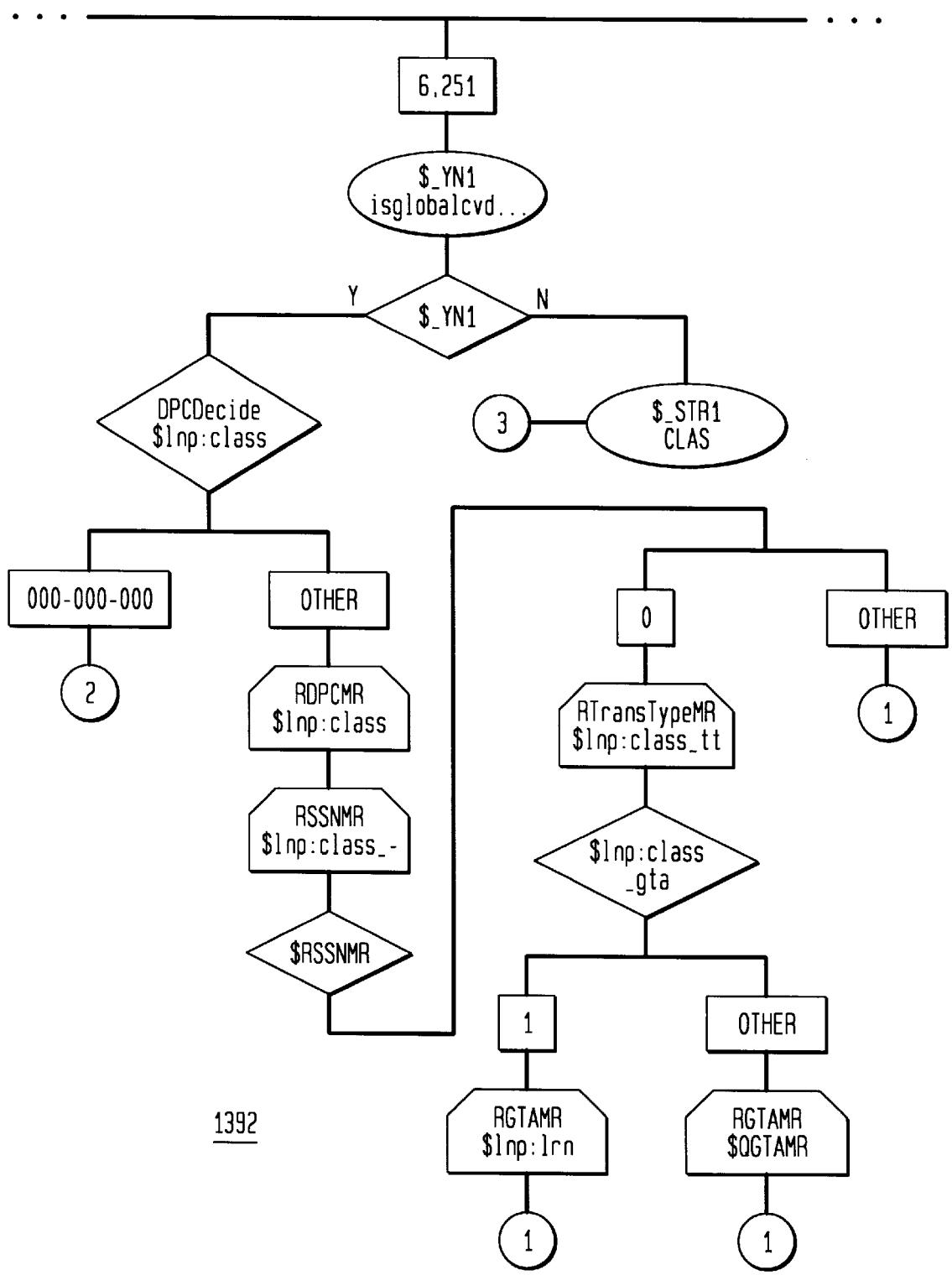
Figure 13C:
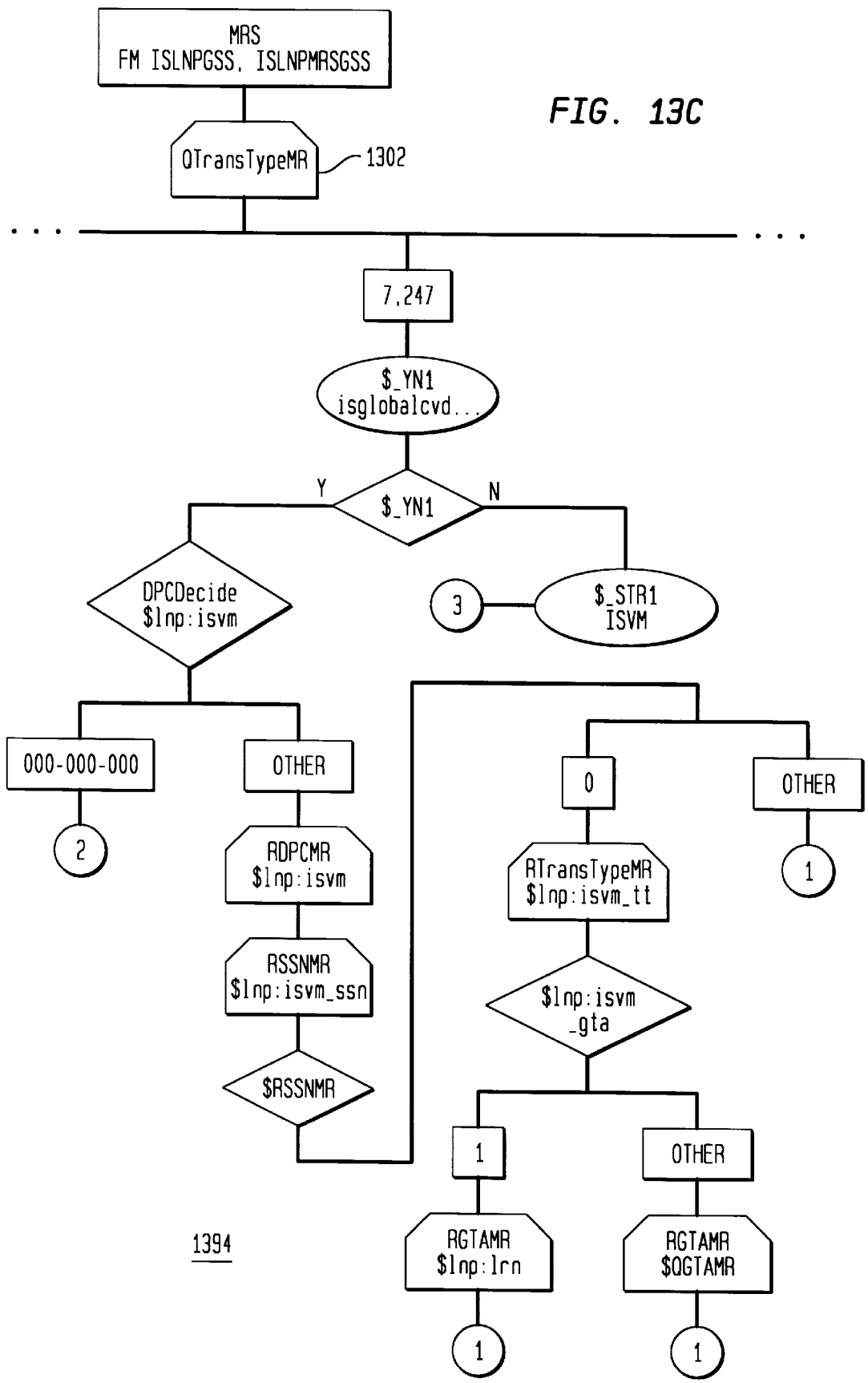
Figure 13D:
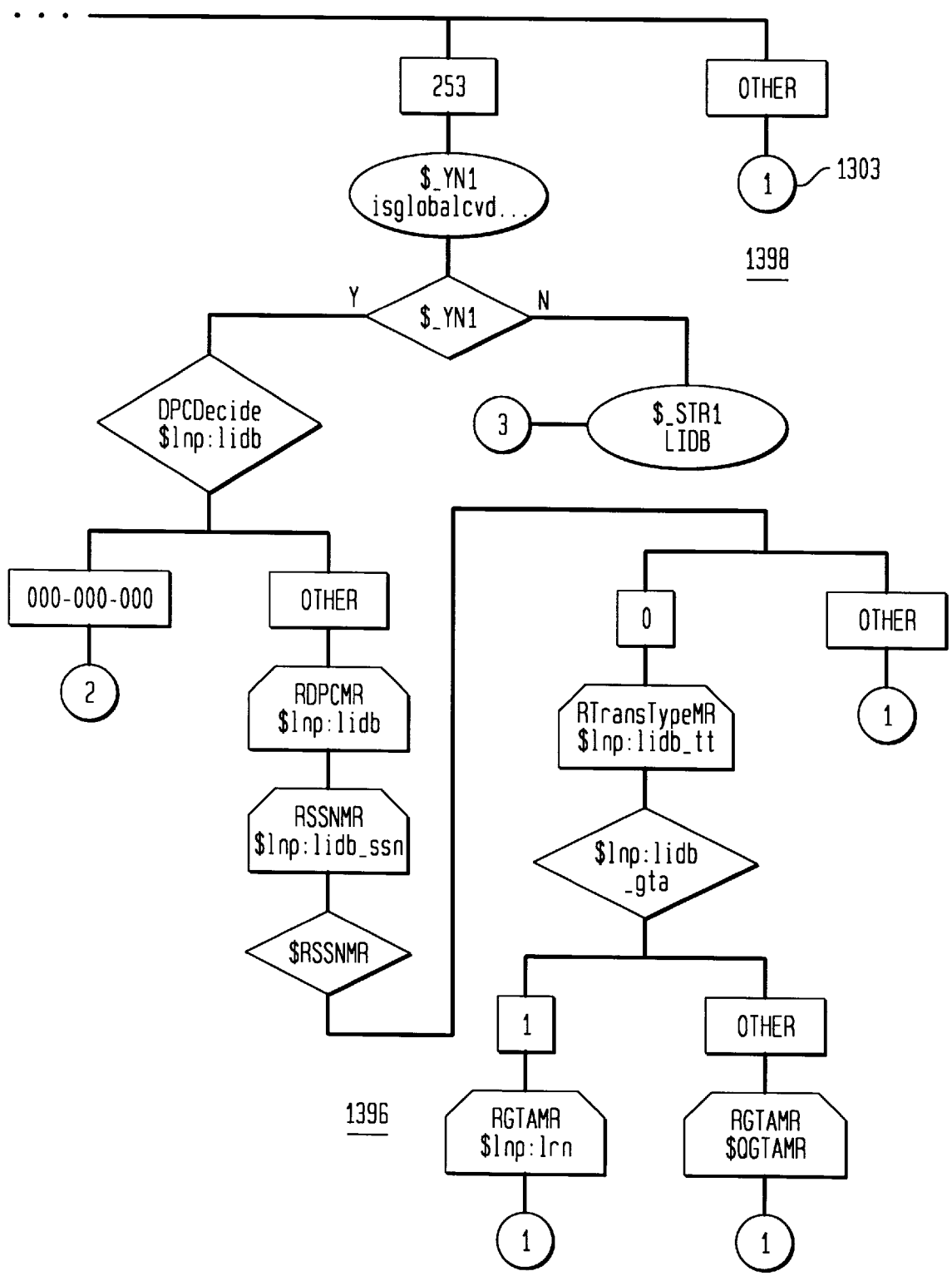

FIGS. 11 and 12 show screen shots from the SPACE system which implements the LRN feature manager for the AIN protocol and IN protocol, respectively. Since the logic proceeds similarly for each, only the LRN/AIN implementation will be discussed. The manager first determines from the subscriber record whether the LNP data has been defined, indicating that the dialed number has been ported (step 110). In step 112, the manager makes a decision based on that determination. If the number has been ported, and thus LNP data exists in the subscriber record, the manager follows the "yes" branch and assigns the LRN as the routing number (step 114). This information is then returned to the switch (step 116). Following the "no" branch, in which the dialed number has not been ported and the default subscriber record is used, the dialed number is assigned as the routing number (step 118). The ISCP then sends a response message containing this information (step 120).

FIG. 13 shows the service logic for the MRS feature manager. The manager first decides which service the query relates to based on the translation type (TT) in the query (step 1302). There are five branches, one for each of the four services discussed above (CLASS, LIDB, CNAM, and ISVM), and a fifth branch for queries not related to any of these services. The processing proceeds down branch 1390 for the CNAM service, branch 1392 for the CLASS service, branch 1394 for the ISVM service, branch 1396 for the LIDB service, and branch 1398 for other services. Currently, if an unsupported service is invoked, the manager chooses branch 1398 and returns an error message (step 1303).

Figure 14:
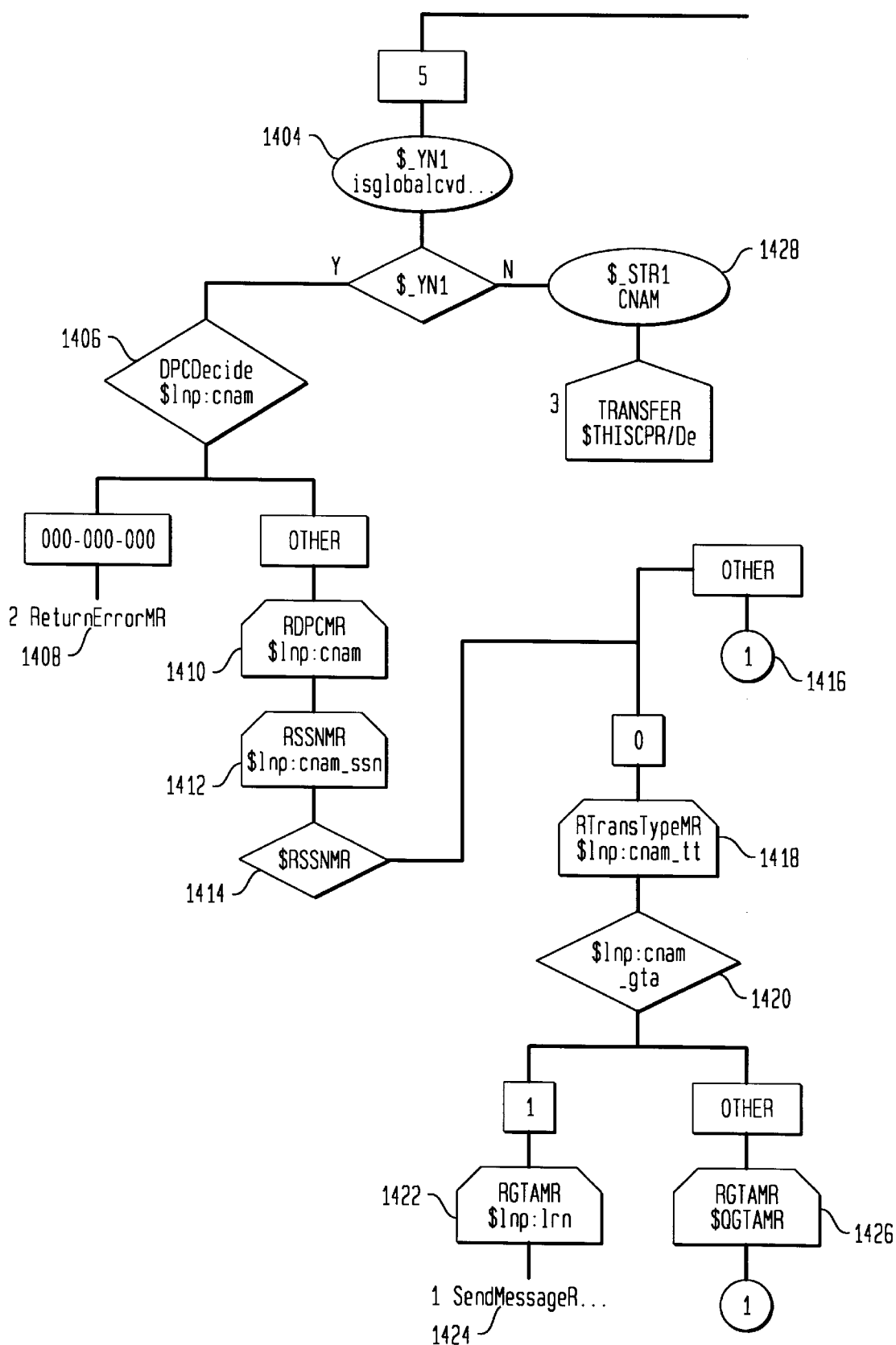
FIG. 14 is a drawing of a branch of the MRS feature manager shown in FIG. 13.

The logic within each of the four branches 1390, 1392, 1394, and 1396 is similar. For explanatory purposes, only the logic associated with branch 1390 (CNAM), shown in greater detail in FIG. 14, will be described.

The MRS feature manager first determines if the data exists for this query (step 1404); that is, if LNP data exists in the subscriber record. If so, the manager then determines whether the particular service requested is provided by the service provider (step 1406). If the service is not provided by the service provider, the manager returns an error (step 1408). If the service provider does provide the requested service, the manager assigns the network address of the appropriate STP or SCP as the destination point code in the response message (step 1410). A subsystem number for the customer for the CNAM service is also assigned to the response message (step 1412).

The manager then makes a decision based on the assigned subsystem number (step 1414). If the subsystem number is other than zero, indicating that final routing is in place, all the information necessary for the STP to route the call has been provided; namely, the destination point code and the subsystem number. The manager then sends the response message (step 1416). If the subsystem number is zero, indicating intermediate routing, the translation type is assigned to the response message (step 1418).

The manager then determines which set of requirements, the Illinois Commerce Commission (ICC) or Bell Communications Research, Inc. (Bellcore) requirements, are being used based on the global title address (GTA) (step 1420). If the GTA is "1," the Bellcore requirements are in place, and the LRN is assigned as the global title address (GTA) (step 1422). The response message is then sent (step 1424). If GTA is other than 1, indicating that the ICC requirements are in place, the manager follows the "other" path where the LRN is not substituted for the GTA. Instead, the GTA is assigned the same value (step 1426).

Figure 15:
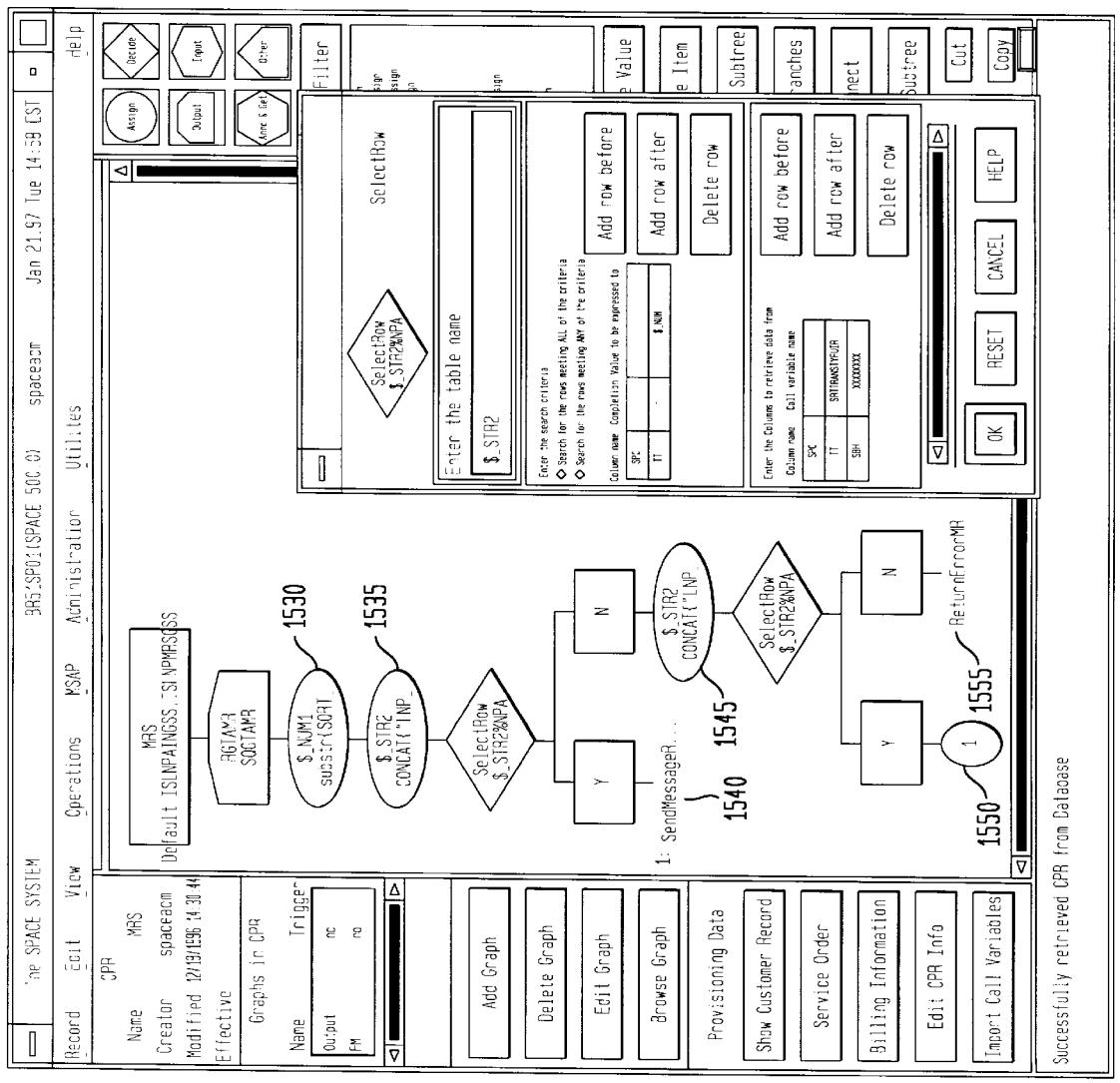
FIG. 15 is a display of the implementation of the MRS feature manager for processing a default subscriber record on a SPACE based system in accordance with an embodiment of the present invention.

Returning to step 1404, if the data is not defined for this service, this indicates that an MRS query has arrived at an ISCP, but no corresponding LNP data has been provisioned. This occurs when the subscriber has a non-ported telephone number. The manager assigns a value to a temporary string (step 1428), which, as shown in FIG. 15, is concatenated with various other values (step 1530). This concatenated value allows the manager to access an appropriate service table to determine final routing information based on the subscriber's geographic area. The manager first checks the appropriate service table (LIDB,CNAM, ISVM, or CLASS) for the competitive local exchange carrier (CLEC) (step 1535). If the NPA-NXX is found in the table, the manager retrieves and returns the corresponding SPC, translation type (TT), and subsystem number (SSN) to the SSP (step 1540). If the NPA-NXX is not found in the table, the manager checks the appropriate service table for the local exchange carrier (LEC) (step 1545). If the value is found in the table, the corresponding SPC, TT, and SSN are retrieved and returned to the SSP (step 1550). Otherwise, the manager returns an error message to the SSP (step 1555).

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims and their equivalents.

We claim:

1. A method for implementing LNP services comprising the steps of:

receiving a message;

accessing a subscriber record according to information in the message;

selecting one of a location routing number (LRN) feature manager or message relay service (MRS) feature manager according to information in the message;

executing the selected feature manager to generate a response message according to information contained in the message and the subscriber record; and sending the response message.

2. The method of claim 1 wherein the accessing step includes the step of:

accessing a subscriber record according to a ten-digit dialed number contained within the message.

3. The method of claim 2 further including the step of:

if a subscriber record does not exist for the ten digit dialed number, accessing a default subscriber record.

4. A method for performing a message relay service (MRS) comprising the steps of:

receiving a message;

accessing a subscriber record according to information in the message;

determining, based on the subscriber record, if a subscriber has ported from one service provider to another;

if the subscriber has ported, determining whether a service provider provides the requested service;

if the service provider provides the requested service, generating a response message including a destination point code of a network element and a subsystem number;

determining, based on the subsystem number, whether final or intermediate routing is being used;

if intermediate routing is being used, assigning a translation type (TT) to the response message;

substituting or not, based on a global title address (GTA), the location routing number (LRN) for the GTA in the response message; and sending the response message.

5. The method of claim 4 further including the step of:

determining which of a plurality of services the message is requesting.

6. The method of claim 5 wherein the step of determining which of a plurality of services a received message is requesting includes the step of:

if the received message is requesting a service other than one of the plurality of services, returning an error.

7. The method of claim 5 wherein the step of determining which of a plurality of services a received message is requesting includes the step of:

determining which of Custom Local Area Signaling Services (CLASS), Inter-Switch Voice Messaging (ISVM), Line Information Database (LIDB), and Calling Name Delivery (CNAM) services a received message is requesting.

8. The method of claim 4 wherein the step of determining, based on the subscriber record, if a subscriber has ported from one service provider to another includes the step of:

if the subscriber has not ported, accessing tables to determine final routing information.

9. The method of claim 8 wherein the table accessing step includes the step of:

accessing tables containing final routing information for a competitive local exchange carrier (CLEC) and/or a local exchange carrier (LEC).

10. The method of claim 4 wherein the step of determining whether a service provider provides the requested service includes the step of:

if the service provider does not provide the requested service, returning an error.

11. The method of claim 4 wherein the step of determining, based on the subsystem number, whether final or intermediate routing is being used includes the step of:

if final routing is being used, sending the response message.

12. A system for implementing local number portability (LNP) comprising:

a switch for sending a message;

a signaling transfer point (STP) coupled to the switch for receiving and routing the message;

an ISCP coupled to the STP for receiving the message; and a processor associated with the ISCP for executing a location routing number (LRN) feature manager and a message relay service (MRS) feature manager.

13. The system of claim 12 wherein the LRN feature manager includes:

an LRN feature manager for the intelligent network (IN) protocol; and an LRN feature manager for the advanced intelligent network (AIN) protocol.

* * * * *

UNITED STATES PATENT AND TRADEMARK OFFICE
CERTIFICATE OF CORRECTION

PATENT NO. : 5,949,870
DATED : September 7, 1999
INVENTOR(S) : J. D. Hayduk, J. Bajzath, P. Huang, and C. Schaefer It is certified that error appears in the above-identified patent and that said Letters Patent is hereby corrected as shown below:

Column 4, line 35, after "The" change "STP to --SSP--.
FIG. 4, change the right most "SSP" to --SCP--.
FIG. 5, change the right most "SSP" to --SCP--.

Signed and Sealed this

Thirteenth Day of June, 2000

Q. TODD DICKINSON

*Attest:*

*Attesting Officer*       *Director of Patents and Trademarks*